Patented June 25, 1940

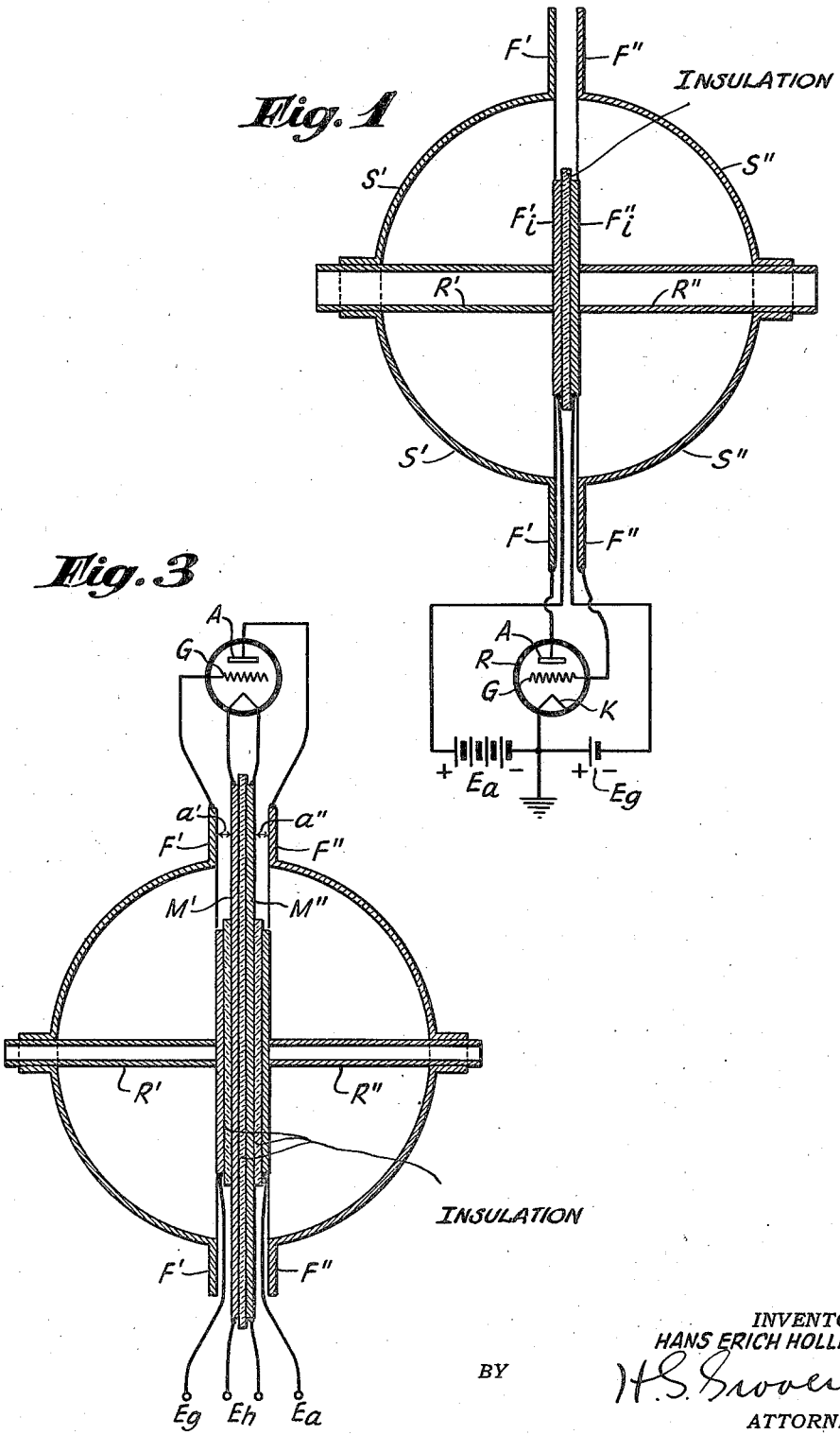

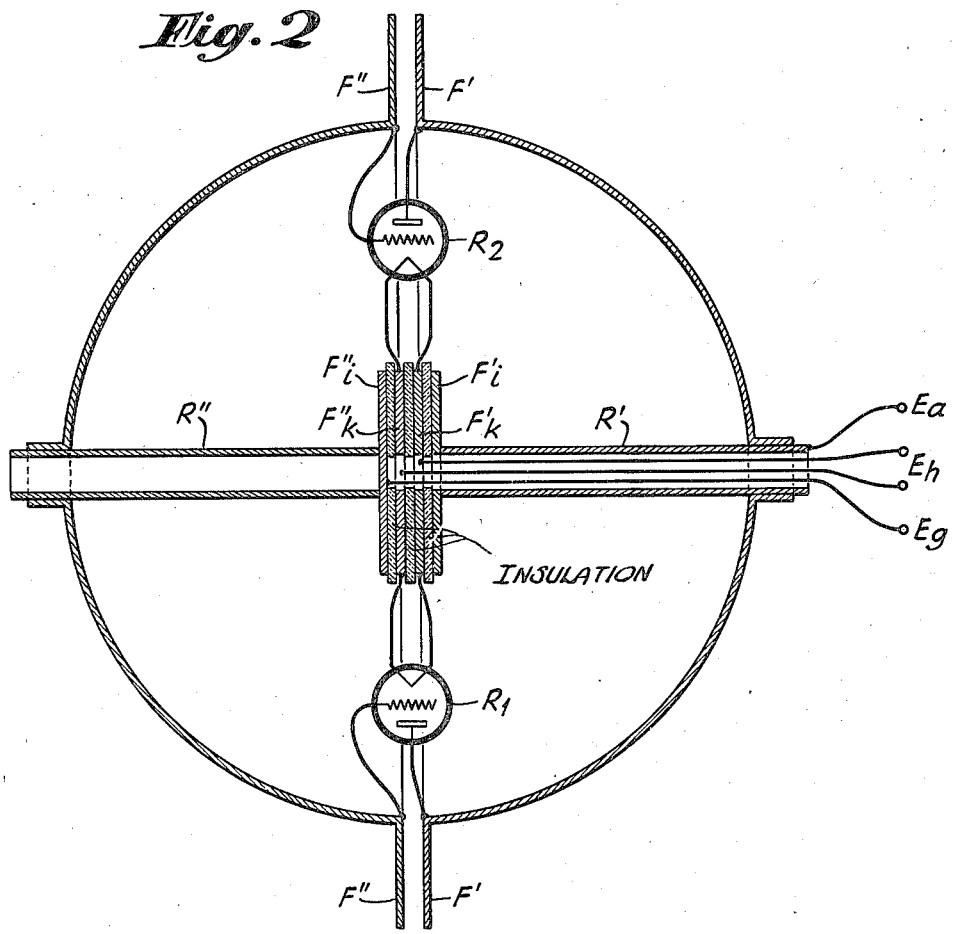

2,205,852

UNITED STATES PATENT OFFICE 2,205,852

SHORT-WAVE RESONANT CIRCUIT

Hans Erich Hollmann, Berlin, Germany, assignor to Telefunken Gesellschaft für Drahtlose Telegraphie m. b. H., Berlin, Germany, a corporation of Germany Application June 24, 1938, Serial No. 215,535
In Germany July 3, 1937

8 Claims. (Cl. 250—38)

As an excellent means for increasing the fly wheel resistance of an ultra-short-wave resonant circuit, and for attaining also, at very high frequencies, the impedance matching value prescribed by the inner resistance of the oscillation tube, the axially symmetrical load circuit has been developed. This circuit comprises two metal cups mounted on an axial tube and having a semi-spherical or rectangular cross section, or corresponding spherical calottes and the like are utilized terminating into two equatorial, opposite flanges. While the axial tube forms with the two metal cups the inductance of the oscillatory circuit, the two flanges represent the capacity of the oscillatory circuit. It was found that such a circuit oscillates in an almost quasi-stationary manner, i. e., in the center of the hollow body a voltage node and current loop appear, while the voltage maxima appear at the two flanges. Furthermore, it was found that the reason for the high fly wheel resistance does not lie so much in the proportion between the inductance and capacity as in the extremely low damping resistance of the large surface tube and cups. Moreover, such circuits provide an excellent stability in the frequency because thermal expansions will be compensated.

Aside from these notable advantages as compared with the ordinarily used resonant circuits, a further property of the rotational symmetrical load circuits to be emphasized resides in the possibility that owing to the comparatively large peripheral size they can be excited with several oscillation vacuum tubes (i. e., electron discharge devices) which are to be distributed over the circumference of the capacitive flanges, and that in this way all vacuum tubes can be operated in parallel. To provide an especially favorable construction of a "spherical transmitter" it has already been proposed so to mount the oscillation vacuum tubes inside the hollow body that the grid and the anode are directly placed at the flanges while the tubular cathodes are connected immediately to the center of the spherical circuit, i. e., to the voltage node. In this way a multi-tube transmitter is provided devoid of any distinct connection wires which would carry high frequency. In order to be able to impress upon the electrodes of all oscillation tubes the required feed potentials, it has been suggested to insulate the metal cups from the axial tube by means of bushings so that the entire axial tube can be given cathode potential and the two metal cups can be given the grid and plate potential. The lead-in wires for the grid potential and anode potential are then brought to places at which the metal cups rest on the axial tube and since rather considerable high frequency potentials appear thereat, these places are to be carefully choked if an undesirable leakage of energy across these lead-in wires is to be avoided.

In the following, a special construction of the axially symmetrical load circuit will be described whereby for the sake of simplicity this circuit is described and represented only for semi-spherical metal cups, i. e., as a sphere circuit. The new mode of construction of the sphere circuit differs from the hitherto known circuit in that the axial tube is split in the center as regards direct potential by means of a capacity acting as a short circuit as regards high frequency, thereby offering the advantage that not only the cathode leads, but also the lead-in wires for the grid potential and plate potential can be brought to the oscillation node. Furthermore, this capacitive splitting up offers the possibility to introduce an equatorial grounding sheet and to ground safely above the same the cathode of tubes situated outside the spherical circuit, i. e., the possibility of giving said tubes the high frequency zero potential. In order that this intermediate metal sheet should safely act as an equivalent ground, it is necessary to provide symmetry in the spherical transmitter such as can be accomplished through a capacitive matching.

A better understanding of the invention may be had by referring to the following description which is accompanied by drawings, wherein Figs. 1, 2 and 3 illustrate, by way of example, different embodiments of the invention.

Fig. 1 shows the practical example of a spherical circuit split in the center in accordance with the present invention as it appears in cross section. The metallic axial tube is composed of two entirely identical parts R' and R" mounted on two flanges $F_1'$ and $F_1''$ which are fastened together while an insulating layer separates them for each other electrically, or they may be pressed against each other in any other way whereby they form a capacity representing a short circuit as regards high frequency. The two axial tubes R' and R" have the semi-spherical metal cups S' and S" placed thereon and which terminate at the outer borders into the equatorial capacity flanges F' and F". In order to show the simple manner in which such spherical circuit can excited by an oscillation vacuum tube, such a tube R is also shown in the drawings with the principal connections to said circuit. The grid G and the anode A of oscillation tube R are connected directly to the two flanges F' and F'', while the cathode K can be grounded. Since a voltage node appears approximately in the center of the spherical circuit, it is possible to connect to this place, i. e., to the two flanges $F_1'$ and $F_1''$, the lead-in wires for the grid potential and plate potential without taking the risk of high frequency leaking over these wires. The arrangement as shown is identical with the known three point oscillator circuit.

When attempting to excite oscillatory circuits for ultra-short waves, difficulties are ordinarily encountered in impressing upon the oscillation tube cathode or cathodes the most favorable high-frequency potential or the same high frequency potential of the oscillation node of the load circuit, in other words it is difficult to ground them because the respective connections or ground lines become too long so that the inductances thereof cannot be neglected. The known remedy resides in that either tuning circuits or other variable impedances are inserted in the cathode leads, thereby compensating the impedance of the heating connections, or else in that the transmitter is matched in the proper phase by means of a capacitive voltage divider connected in parallel to the tube. In contrast thereto, the spherical circuit offers the important possibility of connecting the oscillation tubes to the most favorable points of the load circuit without the need of any particular connection lines. In this respect, the simplest arrangement is provided by mounting one or several oscillation tubes in the interior of the spherical circuit. In this arrangement as already proposed, the central flange condenser according to the invention proves to be particularly suitable because it directly offers the possibility without the need of resorting to particular structural measures, of providing connection points for the cathodes of the oscillation tubes which are grounded as regards high frequency but separated as regards the direct potential. To this end it is only necessary to insert between the two flanges $F_1'$ and $F_1''$ of the axial tubes two further metal discs $F_k'$ and $F_k''$, as shown in Fig. 2, and which are insulated against each other by means of interposed insulating discs and connected to the heating voltage source. These two additional discs have the cathode pins of the two oscillation tubes $R_1$ and $R_2$ directly placed thereon, while the grid wires and anode wires of the said oscillation tubes are connected as before to the two flanges F' and F''. Since the place at the circumference for placing the oscillation tubes can be chosen entirely at will, numerous oscillation tubes can be arranged, depending upon the space available and which excite the spherical circuit in parallel connection.

Obviously, oscillation tubes can be mounted inside the circuit only if the spheres are sufficiently large; in other words, in the case of comparatively long waves and at correspondingly small tubes which again can be considered only for small power. When utilizing special tubes, the condition can be improved in that openings are provided in the spherical cups and in the flanges whereby the glass bulbs can protrude out of the spherical circuit, so that only the electrodes are maintained inside the spherical circuit, but in this case not only will the spherical circuit proper be thereby prejudiced as regards its oscillation properties, but this construction requires certain minimum sizes of the spheres, and is thus limited to certain minimum wavelengths. Where such limitation is to be avoided, there remains only the excitation of the circuit through several oscillation tubes arranged wholly outside the sphere.

In order that also in this case unequivocal conditions of excitation are provided; in other words to avoid any uncertainties due to unknown inductances of the lead-ins, in accordance with a further feature of the present invention, the two sheets $F_k'$ and $F_k''$ in Fig. 2 are enlarged to such an extent that they protrude beyond the capacitive flanges F' and F'', as shown in cross section in Fig. 3. Fig. 3 furthermore shows the way in which a tube can be connected in an entirely analogous manner to the spherical circuit without requiring long connection wires, in that exactly as in the case of Fig. 2 the contact pins are placed on the two center metal sheets M' and M'', and in that the grid and anode are connected to the two flanges F' and F''. According to this scheme, it will be obvious that other oscillation tubes can be connected to the spherical circuit, the tubes being distributed preferably at equal distances over the circumference of the outer flanges.

The connecting of one or several oscillation tubes with the spherical circuit so far described, whether the oscillation tubes are inside or outside the circuit, entails considerable asymmetry of the oscillation state since in fact the one-half sphere is loaded with the grid cathode capacity and the other one with the plate capacity. The different values of these two capacities have the effect that the voltage node moves away from the center of the sphere towards the side of the anode and that therefore the center of the sphere at which according to the invention the blocking condenser and the center metal sheets are situated, no longer represents an actual ground point. The close examination of such a spherical transmitter thus reveals that it is always at the grid side at which the higher high frequency potentials appear.

The insertion of the center metal sheets M' and M'' in accordance with the present invention and as shown in Fig. 3, offers a simple possibility of rendering the spherical transmitter symmetrical, i. e., of exciting it in such manner that the oscillation energy will be equally distributed over both half spheres, it being only necessary in order to compensate for the inequality of the oscillation tube capacities by means of the capacitive voltage divider obtained by the center metal sheets, to choose the distance $a''$ of the flange F'' at the anode side from the center metal sheet M'' in proportion to the grid-anode capacities to be considered, larger than the distance $a'$ of the flange F' at the grid side from the center metal sheet M'. The matching entails a notable improvement in the first place in case of several oscillation tubes in which the unequal load will be much more noticeable than in case of a single tube owing the sum effect of the capacities of the several oscillation tubes.

In conclusion, it should be remarked that the stated symmetrizing by means of a capacitive voltage divider arranged inside the spherical circuit may be carried out for instance also in the arrangement shown in Fig. 1, in which case a single center metal sheet taking the place of M' and M'' in Fig. 3 will be sufficient. The symmetrizing can likewise be resorted to in the transmitter shown in Fig. 2 with interior oscillation tubes by enlarging one of the two inner discs $F_k'$ or $F_k''$, such that it protrudes between the outer flanges $F'$ and $F''$.

It should be understood that the modes of construction of spherical transmitters herein described may also be equipped in an analogous manner with retarding field tubes (i. e., Barkhausen) or magnet field tubes (i. e., magnetron).

What is claimed is:

1. In combination, an ultra high frequency tuned oscillatory circuit in the form of a metallic surface of revolution, said surface of revolution being divided into two similarly constructed and symmetrically located parts capacitively coupled together at their adjacent edges by spaced flanges, a lumped capacitor substantially in the center of said surface of revolution and coupled to opposite points on said two parts by inductance in the form of rods, an electron discharge device having an anode, a cathode and a control electrode, direct connections from said anode and control electrode to different ones of said flanges, and at least one connection from said cathode to said lumped capacitor.

2. In combination, an ultra high frequency tuned oscillatory circuit in the form of a metallic surface of revolution, said surface of revolution being divided into two similarly constructed and symmetrically located hemispherical parts capacitively coupled together at their adjacent edges by spaced flanges, a lumped capacitor substantially in the center of said surface of revolution and having different plates directly connected from a direct current standpoint to opposite points on said two parts by inductance in the form of rods.

3. In combination, an ultra high frequency tuned oscillatory circuit in the form of a metallic surface of revolution, said surface of revolution being divided into two similarly constructed and symmetrically located hemispherical parts capacitively coupled together at their adjacent edges by spaced flanges, a lumped capacitor substantially in the center of said surface of revolution and having different plates directly connected from a direct current standpoint to opposite points on said two parts by inductance in the form of rods, said rods being arranged in the same straight line and positioned along the axis of said surface, said lumped capacitor comprising a plurality of spaced metallic plates located between the adjacent ends of said rods.

4. In combination, an ultra high frequency tuned oscillatory circuit in the form of a metallic surface of revolution, said surface of revolution being divided into two similarly constructed and symmetrically located parts capacitively coupled together at their adjacent edges by spaced flanges, a lumped capacitor substantially in the center of said surface of revolution and having different plates directly connected from a direct current standpoint to opposite points on said two parts by inductance in the form of rods, said rods being arranged in the same straight line and positioned along the axis of said surface, an electron discharge device having an anode, a cathode and a grid, individual connections from said anode and grid to different ones of said flanges, and connections from said cathode to other plates of said capacitor.

5. In combination, an ultra high frequency tuned oscillatory circuit in the form of a metallic surface of revolution, said surface of revolution being divided into two similarly constructed and symmetrically located parts capacitively coupled together at their adjacent edges by spaced flanges, a lumped capacitor substantially in the center of said surface of revolution and coupled to opposite points on said two parts by inductance in the form of rods, said capacitor including a pair of plates located between said rods and insulated both from each other and from said rods, an electron discharge device having an anode, a cathode and a control electrode, individual connections from said anode and control electrode to different ones of said flanges, and connections from the legs of said cathode to said plates.

6. In combination, an ultra high frequency tuned oscillatory circuit in the form of a metallic surface of revolution, said surface of revolution being divided into two similarly constructed and symmetrically located parts capacitively coupled together at their adjacent edges by spaced flanges, a lumped capacitor substantially in the center of said surface of revolution and coupled to opposite points on said two parts by inductance in the form of rods, said capacitor including a pair of plates located between said rods and insulated both from each other and from said rods, an electron discharge device having an anode, a cathode and a control electrode, individual connections from said anode and control electrode to different ones of said flanges, and connections from the legs of said cathode to said plates, said pair of plates protruding beyond said flanges and serving to support said electron discharge device.

7. In combination, an ultra high frequency tuned oscillatory circuit in the form of a metallic surface of revolution, said surface of revolution being divided into two similarly constructed and symmetrically located parts capacitively coupled together at their adjacent edges by spaced flanges, a lumped capacitor substantially in the center of said surface of revolution and coupled to opposite points on said two parts by inductance in the form of rods, said capacitor including a pair of plates located between said rods and insulated both from each other and from said rods, a plurality of electron discharge devices each having an anode, a cathode and a control electrode, individual connections from the anode and control electrode of each device to different ones of said flanges, and connections from the legs of the cathode of each device to said plates.

8. A combination in accordance with claim 7, characterized in this that the distances between the flanges and the adjacent protruding plates of said capacitor are different.

HANS ERICH HOLLMANN.